United States Patent [19]

Fujiyama et al.

[11] Patent Number: 4,712,180

[45] Date of Patent: Dec. 8, 1987

[54] EDITING SYSTEM OF EDUCATIONAL PROGRAM FOR A COMPUTER ASSISTED INSTRUCTION SYSTEM

[75] Inventors: Seiki Fujiyama, Taito; Myonghi Lee, Bunkyo, both of Japan

[73] Assignee: Sillony Company Limited, Hong Kong

[21] Appl. No.: 649,218

[22] Filed: Sep. 10, 1984

[30] Foreign Application Priority Data

Sep. 12, 1983 [JP] Japan .................................. 58-168077

[51] Int. Cl.⁴ ........................ G06F 15/38; G06G 7/60
[52] U.S. Cl. .................................... 364/419; 434/321; 434/309; 360/72.1
[58] Field of Search ................. 364/419; 434/307, 308, 434/309, 321, 323, 334, 319; 360/72.1, 72.2

[56] References Cited

U.S. PATENT DOCUMENTS 3,996,671 12/1976 Foster .................................. 434/321
4,384,284 5/1983 Juso et al. ........................... 434/307

Primary Examiner—E. A. Goldberg
Assistant Examiner—Lincoln Donovan
Attorney, Agent, or Firm—Fliesler, Dubb, Meyer & Lovejoy

[57] ABSTRACT

An editing system of educational programs for a CAI system recording on a CMT, in parallel, both audio data to be served for learning through student's auditory sense and digital data such as character and graphics information to be served for learning through the student's visual sense. The editing system provides a CAI system having an inexpensive CAI terminal machine with high learning efficiency.

26 Claims, 18 Drawing Figures

FIG. — 1

FIG.—4C
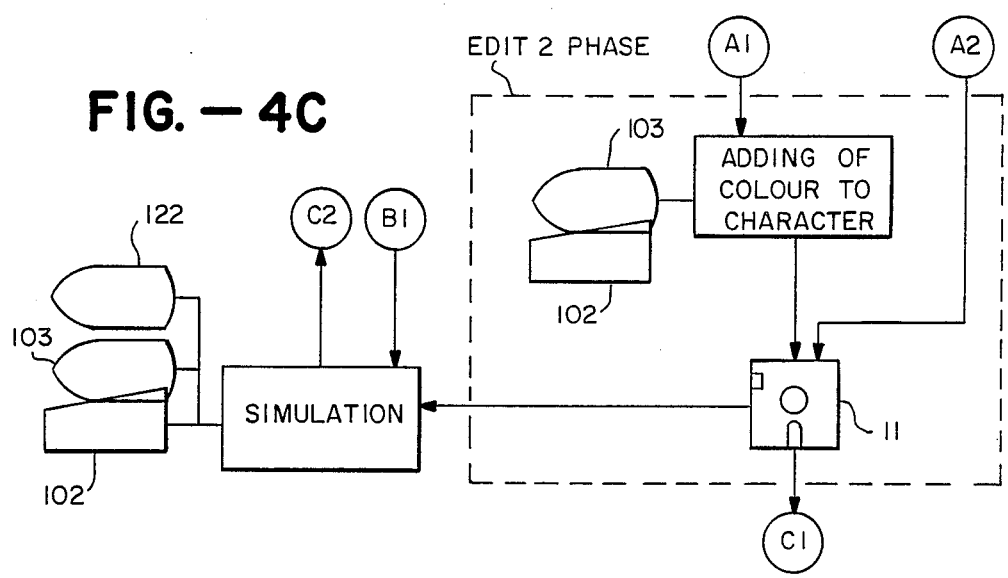
FIG.—4D
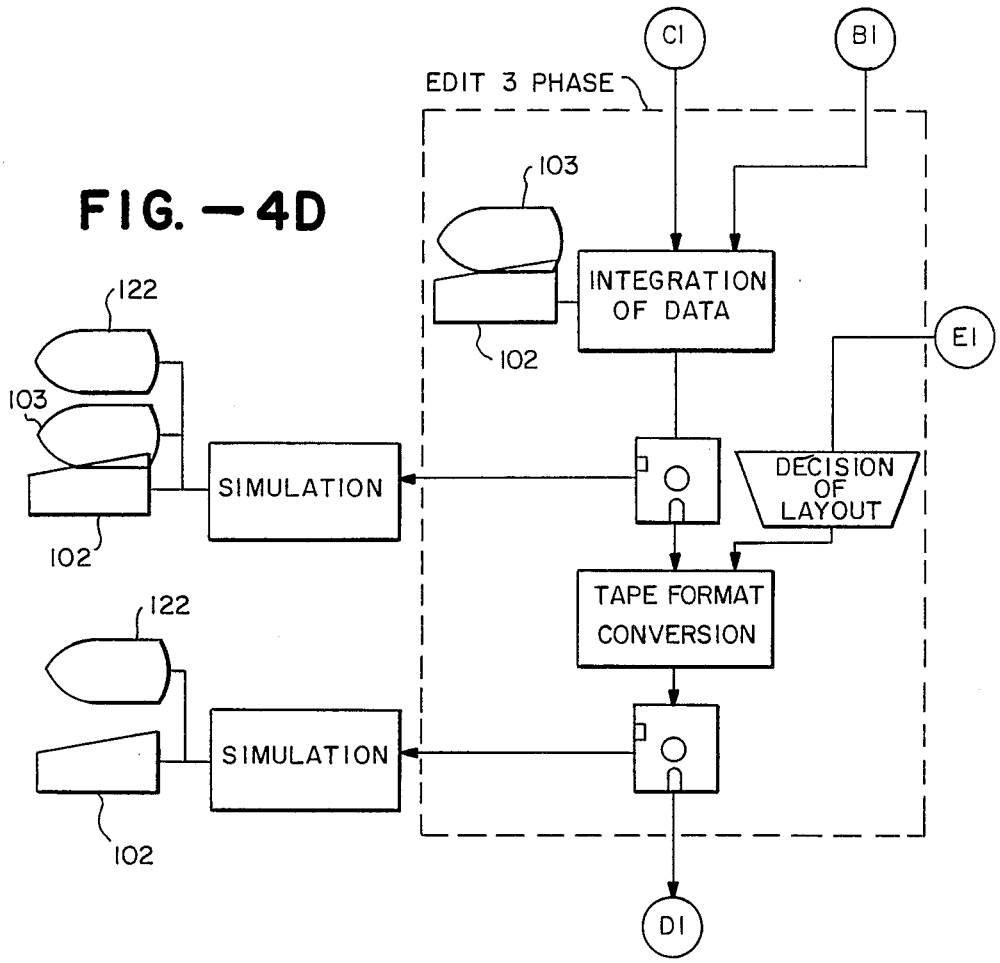

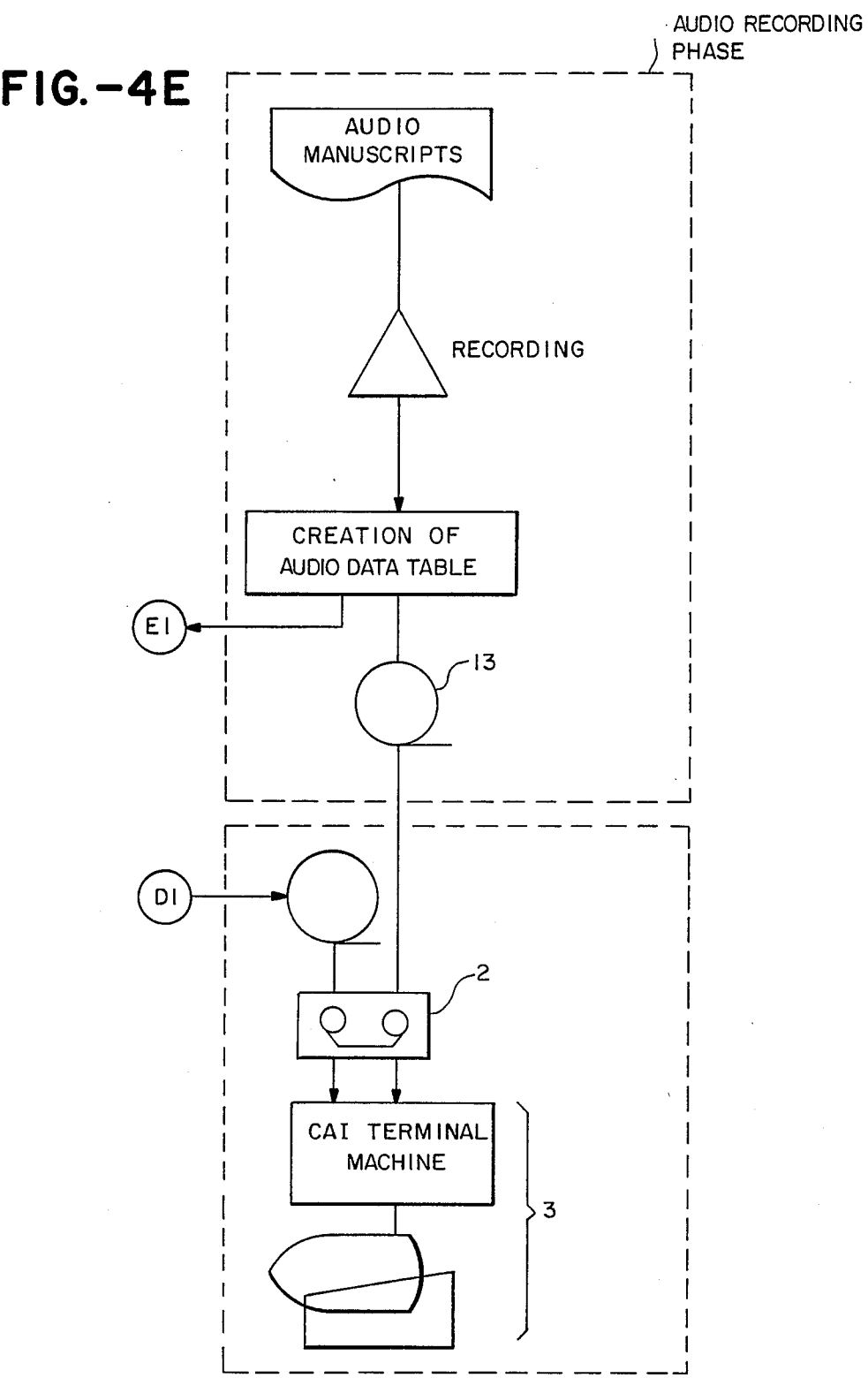

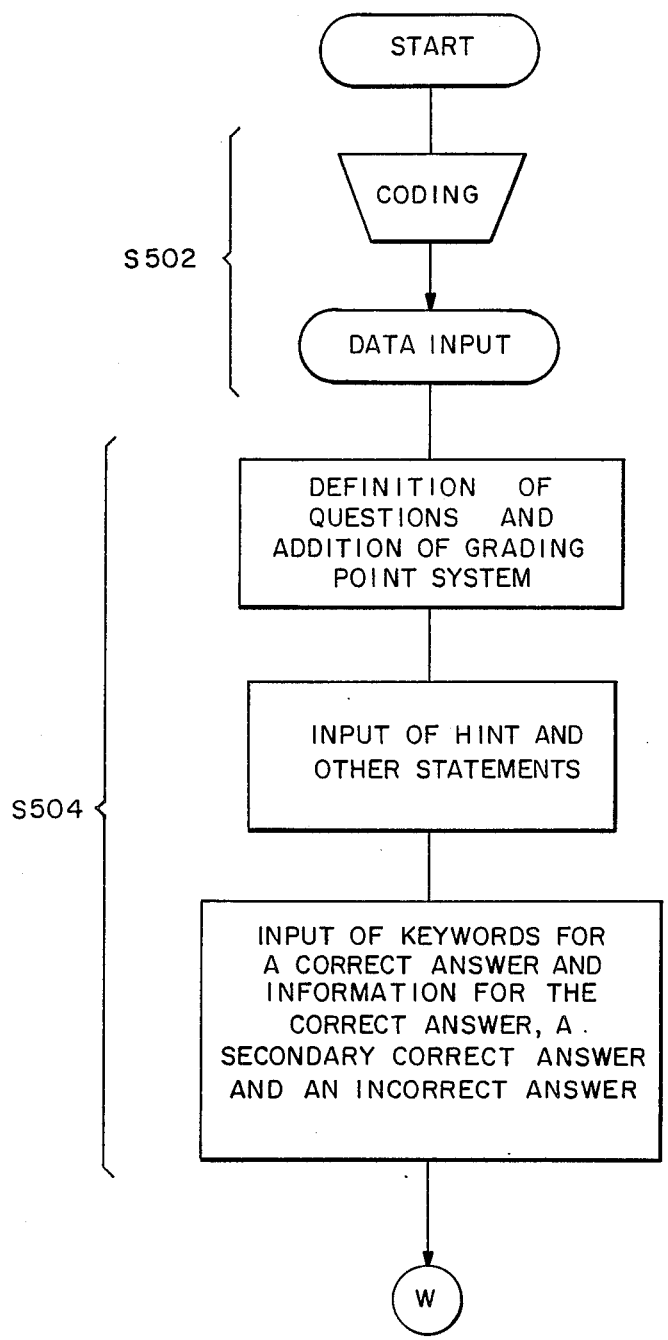
FIG.—5A

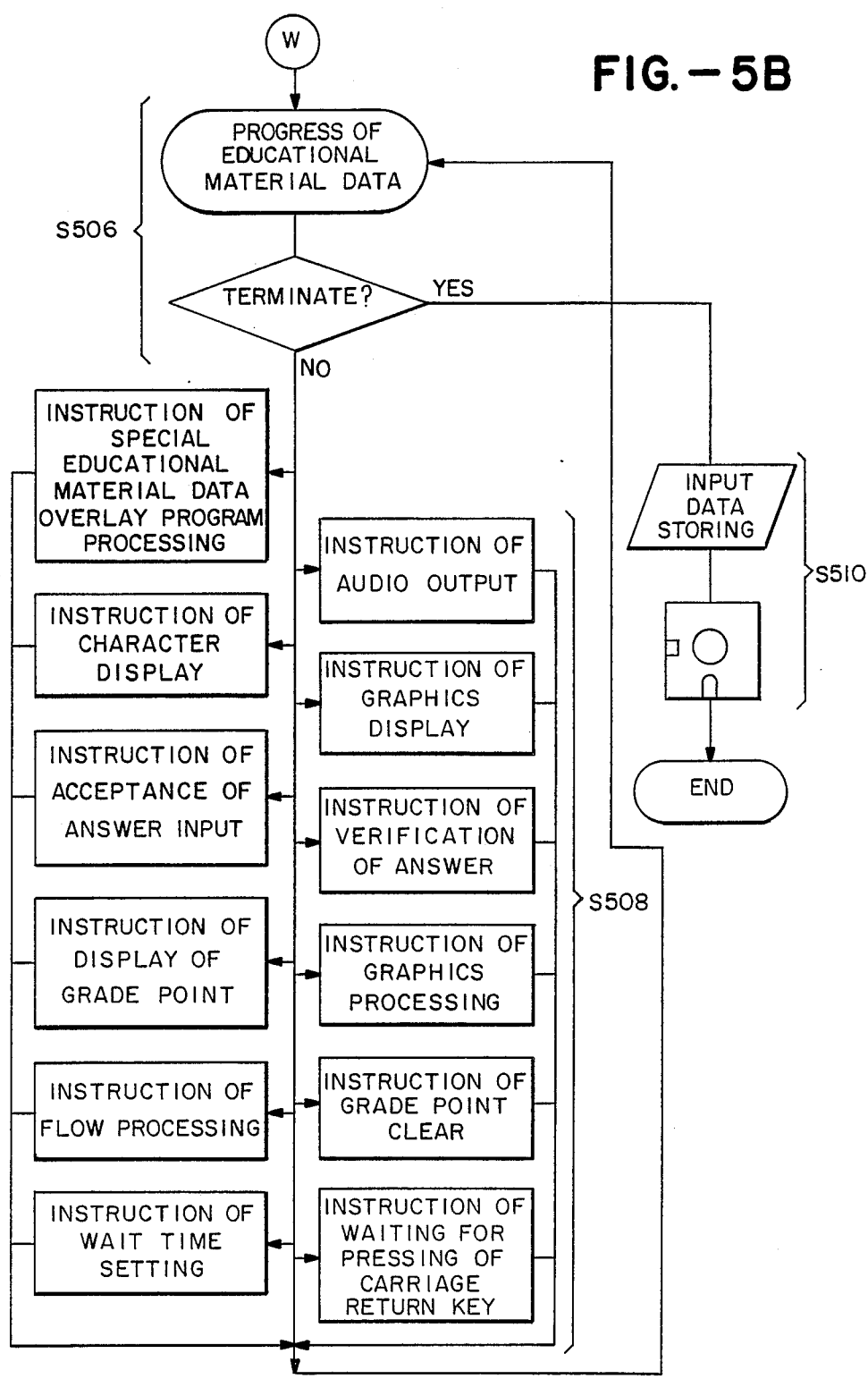
FIG.—5B

FIG.—8
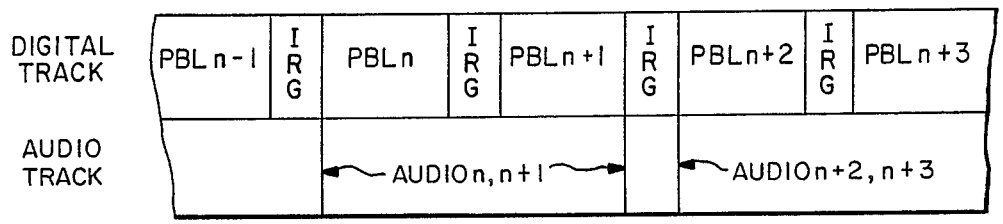
FIG.—9
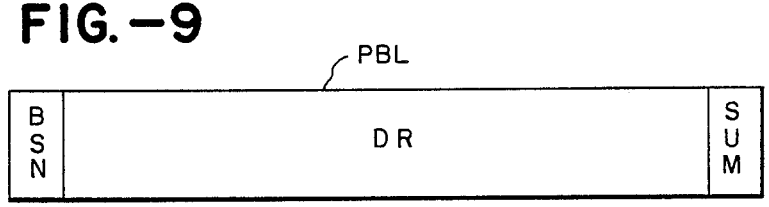
FIG.—10
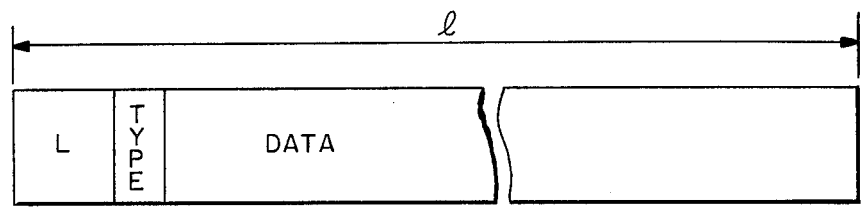

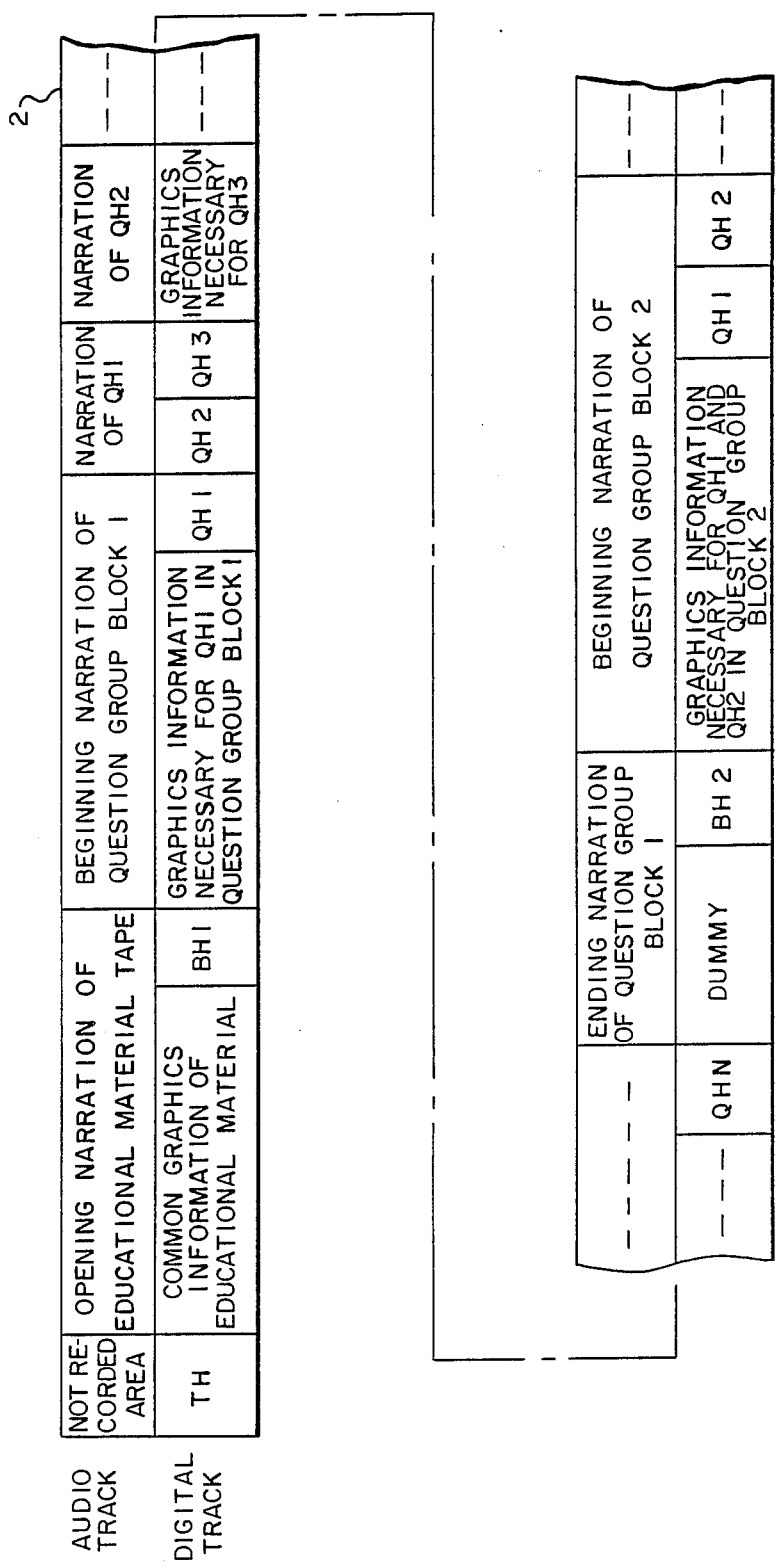
FIG.—11

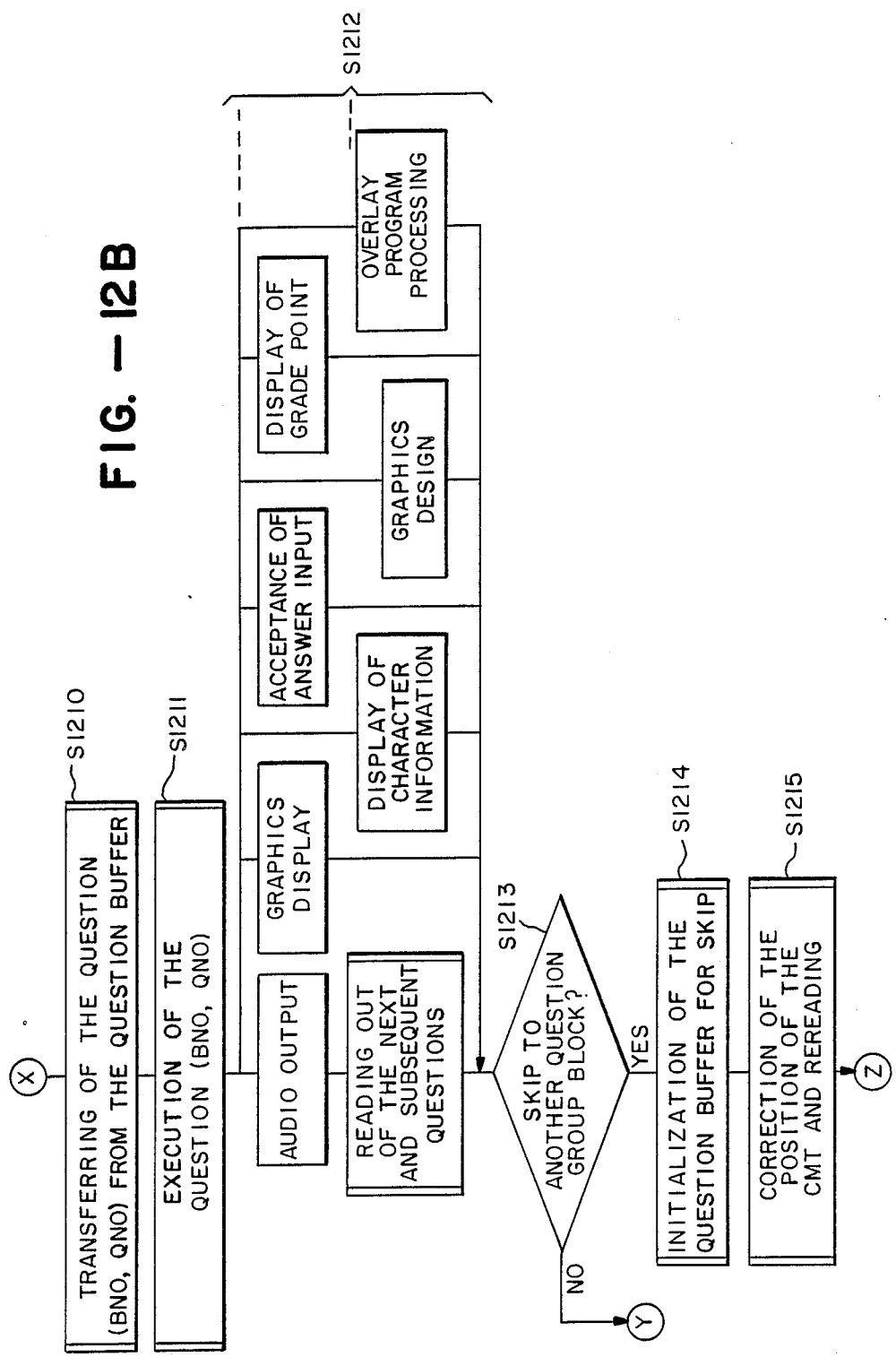

EDITING SYSTEM OF EDUCATIONAL PROGRAM FOR A COMPUTER ASSISTED INSTRUCTION SYSTEM

BACKGROUND OF THE INVENTION

1. Field of the Invention

The present invention relates to an editing system of educational material programs in a computer assisted instruction (CAI) system, and more particularly to a system of editing educational material programs on a cassette magnetic tape (CMT) in a CAI system in which a microcomputer is used as a processing unit and learning progresses in line with an educational material program recorded on a medium such as CMT.

2. Description of the Prior Art

Over the past several years, there has been a recognition of the effectiveness of CAI system which uses computer to assist students in learning. In such a CAI system, learning generally proceeds by student-machine interaction with computer program. If the student makes an error, the program informs him or her of error and prompts for correction.

Conventional CAI systems use large scale mainframe computers for the processor. It is difficult for an individual student to personally and effectively use these systems due to restrictions of cost, location and times of using such computers.

Meanwhile, rapid progress in microcomputer and its peripheral technologies has produced microcomputer-based CAI systems. Microcomputer CAI systems are now available in schools and ordinary households since they are small in size and inexpensive.

In microcomputer-based CAI systems, if a training program proceeds with the aid of visual and aural senses of a student, the student can use the CAI system personally according to his or her own ability and degree of progress, so that he or she can attain a much higher efficiency in study.

SUMMARY OF THE INVENTION

It is, therefore, an object of the present invention to provide an editing system of educational material programs for a microcomputer-based CAI system in which audio data to be served for learning through aural sense are recorded in parallel with digital data, such as characters and picture information, to be served for learning through visual sense on a cassette magnetic tape (CMT), as a medium for recording educational material data of the CAI system.

In order to achieve the object, an educational material editing system according to the present invention comprises an input means for inputting data including information on questions to be assigned to a student; a storage means for storing educational material data produced from the data inputted by the input means; a sound-recording means for recording audio data relating to the problem information; a relocation means for relocating (or rearranging) the educational material data stored in the storage means corresponding to the recorded position of the audio data recorded in the audio means; and means for recording in parallel the relocated educational material data and the audio data in a manner that the relocated educational material data and the audio data relate to each other on a magnetic medium to produce an educational material program.

In the first preferred embodiment of this invention, the data corresponding to the problem information and the audio data are recorded on the recording medium in a manner that the data corresponding to the problem information is always read out prior to the audio data corresponding to the problem information, as the educational material program proceeds.

In the second preferred embodiment of this invention, information indicating the position of the problem information on the recording medium is recorded on the recording medium.

In the third preferred embodiment of this invention, the input means includes a conversion means for converting the problem information into digital data, so that the digital data is stored as the educational data in the storage means.

In the fourth preferred embodiment of this invention, educational material data, including graphics and character information related to problems assigned to the student, has been constructed so that it can be stored in the storage means as educational material data that alternately relates graphics and character information.

In the fifth preferred embodiment of this invention, the recording medium is magnetic tape.

In the sixth preferred embodiment of this invention, there are at least two tracks on one side of the magnetic tape. Physical blocks are set along the running direction of the tape on one of the tracks. Data of a prescribed length can be recorded in these physical records. Alternating with each of the physical records is a non-recording area in which no data is recorded. The physical records are constructed so that digital data can be recorded on them. Audio data is recorded on the other track. The length of the audio data is matched positionally to one or more physical records. The physical record is used as the standard minimum unit of length for an audio block. Recorded audio data starts where one physical record starts and ends at the end of the same or subsequent block.

BRIEF DESCRIPTION OF THE DRAWINGS

FIGS. 4A to 4E are flow charts for explaining each phase in the educational material program editing procedure;

FIGS. 5A and 5B to 7 are flow charts showing one example of processing procedure steps for each phase of the main portion of the present invention;

FIG. 8 is a diagram for illustrating the relationship between the track for recording audio data and the track for recording digital data on CMT;

FIG. 9 is a diagram for illustrating one example of a format of the physical records on the track on which digital data is recorded;

FIG. 10 is a diagram for illustrating one example of the format of the physical records in which is recorded digital data related to an educational material program;

FIG. 11 is a diagram for illustrating one example of the CMT on which audio data and digital data related to the educational material program are recorded; and FIGS. 12A and 12B are flow charts showing one example of steps of the proceeding of the educational material program.

DETAILED DESCRIPTION OF THE PREFERRED EMBODIMENTS

In the following embodiment of the present invention, it is assumed that a CAI terminal machine which can use an educational material program edited by the system according to the present invention has the following functions.

(1) Using a publicly known audio CMT unit, an educational material program that has been recorded on a CMT is read out and learning proceeds in accordance with the read-out program.

(2) The system is equipped, with a colour CRT, as a display means, that can simultaneously display, for example, eight colours including black. The CRT has a horizontal resolution of, for example, 256 dots and a vertical resolution of 192 dots.

(3) The display means can display graphics of the mixture of the eight colours.

(4) The characters are displayed in separate colours.

(5) Responses or answers in written form can be accepted from a student and the verifications and evaluations of those responses can be processed.

Hereinafter, an explanation is made of an editing system for editing an educational material program which is preferable to such a CAI terminal machine, i.e., which has character information (educational material data) and graphics data given to a student who uses the CAI terminal machine and audio data such as narration for questions or problems.

Figure 1:
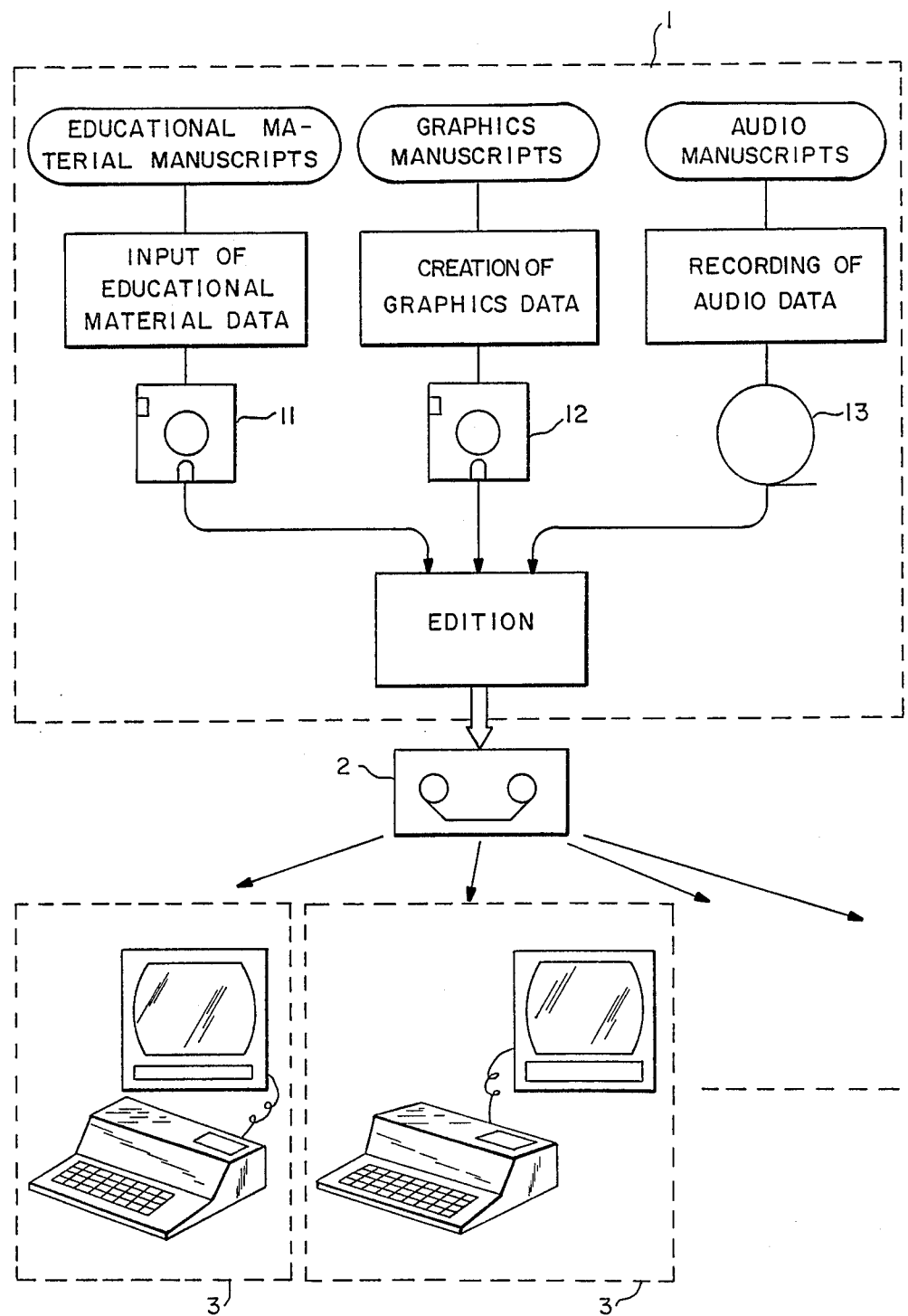
FIG. 1 is a diagram for showing the general outline of an editing system in CAI system according to the present invention.

FIG. 1 is a diagram for explaining a general outline of an editing system according to the present invention. In FIG. 1, reference numerals 1, 2 and 3 denote an editing system, a CMT and a CAI terminal machine, respectively. The input of educational material data based on educational material manuscripts and the creation of graphics data based on graphics manuscripts are performed in the editing system 1. The educational material data and the graphics data are written as digital data on a recording medium, for example, floppy discs 11 and 12, respectively. Audio data such as narration based on audio manuscript is then recorded into an audio tape 13. The digital data and the audio data are arranged in parallel on the CMT2 by the editing system 1 to form an educational material program which is served to the learning of the student who uses the CAI terminal machine 3.

In case that a CMT having two tracks, for example, on each side is used as storage medium, one track is used for the recording of audio data and the other track is used for the recording of digital data.

As to the recording of digital data on the CMT2, a CMT having a recording time of 30 minutes, for example, on one side is used. 350 physical records, each having a fixed data length, for example, 1536 bytes as the unit length is recorded on the one side of the CMT. In other words, data of 500K bytes or more can be recorded on the CMT of one side of a 30-minute type. An inter record gap IRG is arranged between the respective physical records.

With this block of digital data as one unit, the following processes are performed in the CAI terminal machine 3, as instructed by the microprocessor as a main CPU of the CAI terminal machine 3.

(1) Digital data of the specified number of blocks recorded on one track are read out from the CMT while audio data recorded on the other track is being outputted and then transferred to the CPU.

(2) Only the digital data of the specified number of blocks are read out and transferred to the main CPU without outputting the audio data.

(3) The audio data of the specified number of blocks are outputted. The digital data are not transferred at that time.

(4) The tape is skipped to any desired block and the tape is stopped there.

Figure 2:
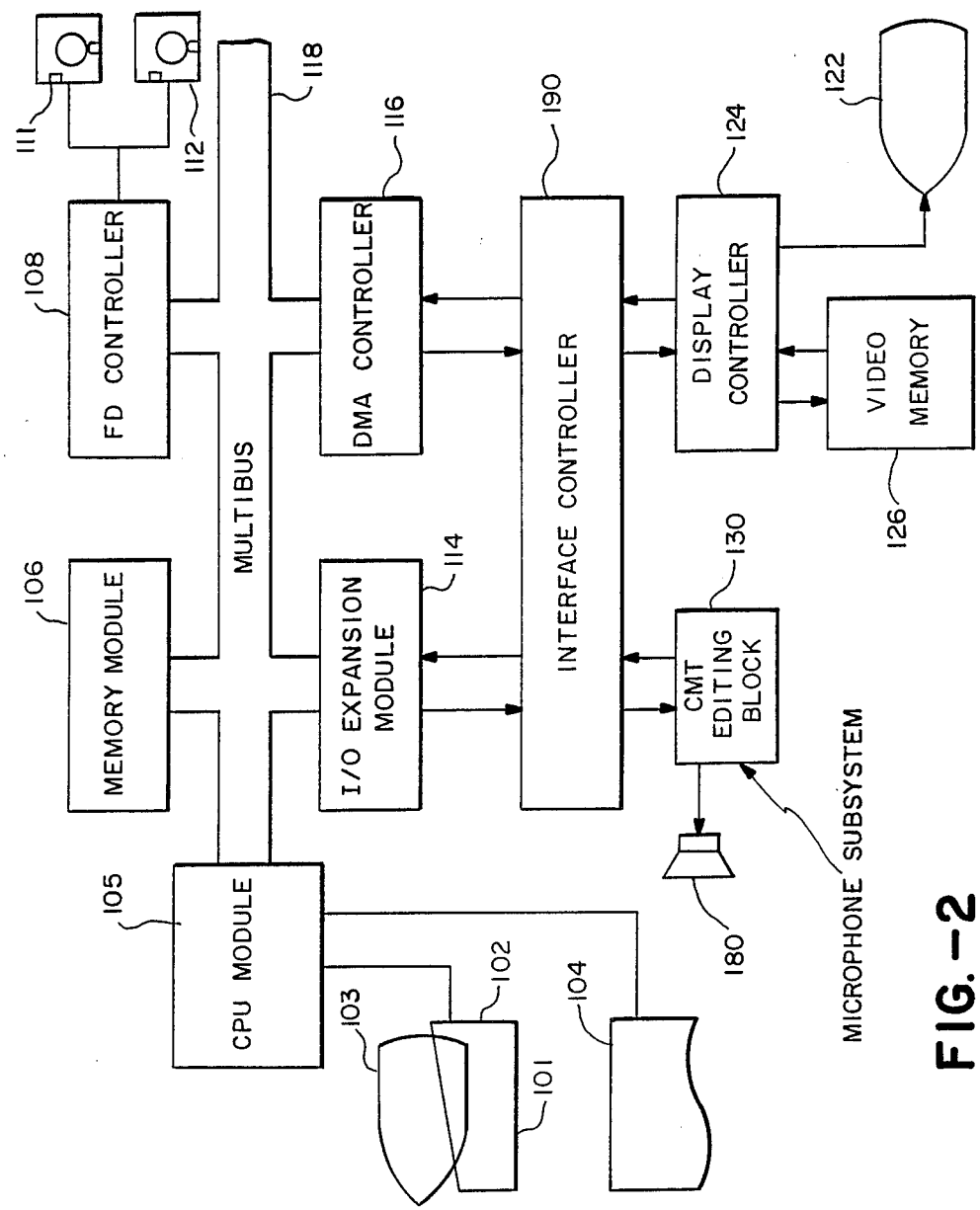
FIG. 2 is a block diagram showing an embodiment of an editing apparatus in the editing system according to the present invention.

FIG. 2 shows an embodiment of the configuration of an editor 1 according to this invention. In FIG. 2, reference numeral 101 denotes a console on which the operator performs inputting, editing etc., of educational material programs. The console 101 may be a console such as DDY86A manufactured by Anritsu Electric Co., Ltd., for example. The console 101 consists of a keyboard 102 and a CRT display 103. A line printer 104 performs the printout of program lists, data sizes, and so on. For example, OKITYPER 8220A, produced by Oki Electric Industry Co., Ltd., can be used as the line printer 104.

A CPU module 105 controls each block in the editor 1 and contains a microprocessor such as Z-80A by Zilog. A memory module 106 has, for example, a storage capacity of 256 kilobytes (KB).

A floppy disc controller (FD controller) 108 controls floppy disc units (FD units) 111 and 112. An expansion module (I/O expansion module) 114 is for the expansion of I/O devices. A DMA controller 116 controls DMA (Direct Memory Access) transfer of data. Units such as DSB-80ZA, DSB-256A, DSB-203, DSB-519 and DSB-501 produced by Densan can be used, respectively, for the blocks 105, 106, 108, 114 and 116. These blocks are coupled through a multibus 118.

A CRT display 122 has colour graphics functions and is used for creation of graphics data by the operator and the monitoring of simulation (to be described later). The CRT display 122 has functions equivalent to those in the display means used in the CAI terminal machine described above. A display controller 124 controls the CRT display 122. A video memory 126 stores data relating to display contents.

A CMT editting block 130 reads out/writes in data on/from the CMT2 and edits educational material programs on the CMT2. Reference numeral 180 denotes a loud speaker.

An interface controller 190 controls the flow of data, signals etc., between the interface (not shown) of the display controller 124 and the interface (see FIG. 3) provided in the CMT editor block 130.

Figure 3:
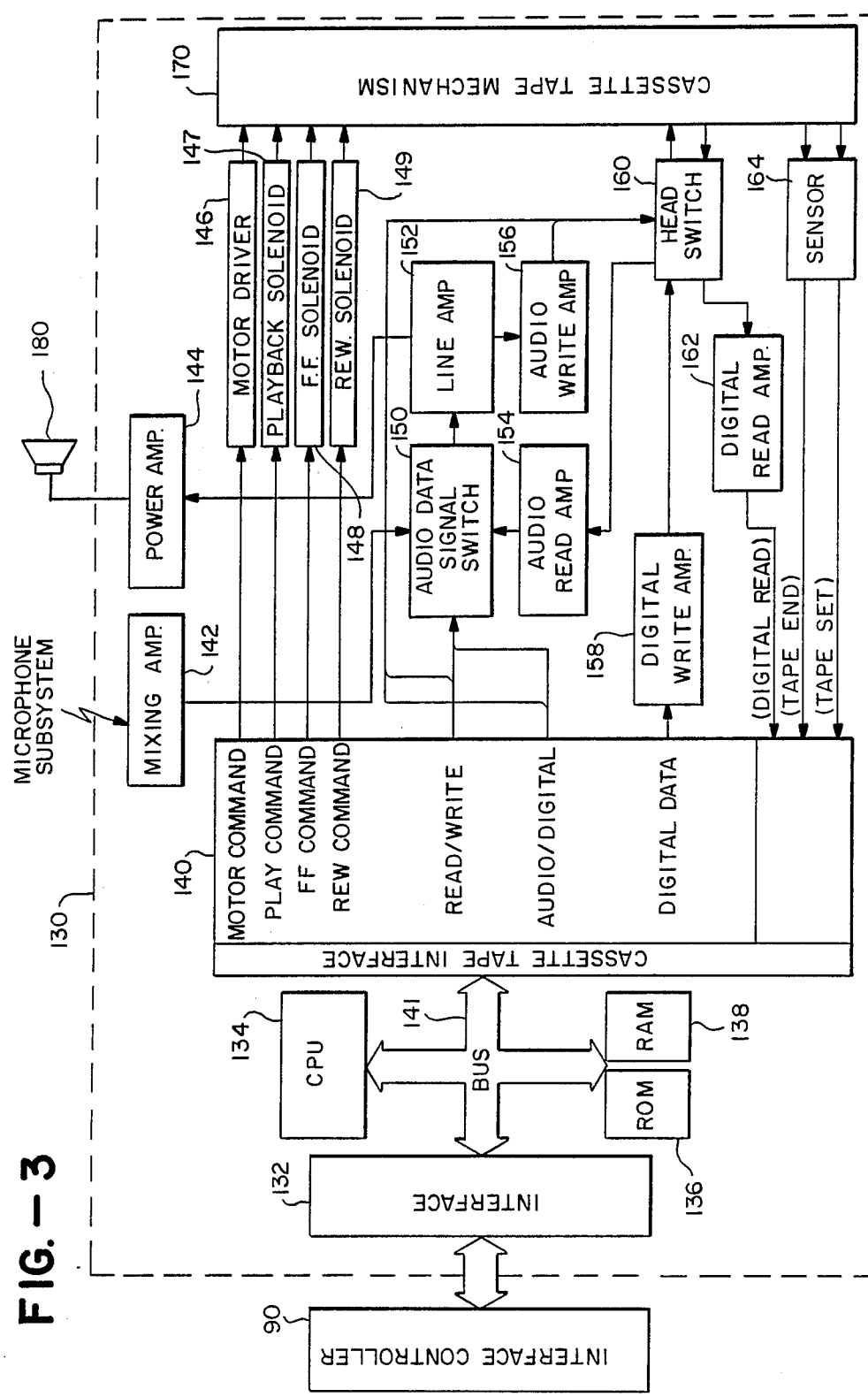
FIG. 3 is a block diagram showing an embodiment of a CMT editing block of the editing apparatus that controls the CMT unit for executing the recording/reproducing of an educational material program.
Figure 4B:
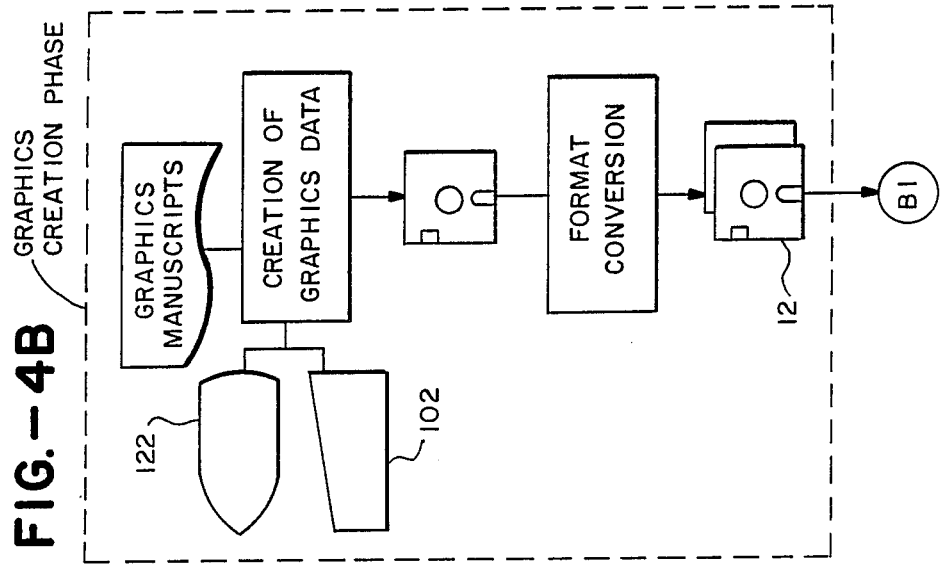
Figure 4A:
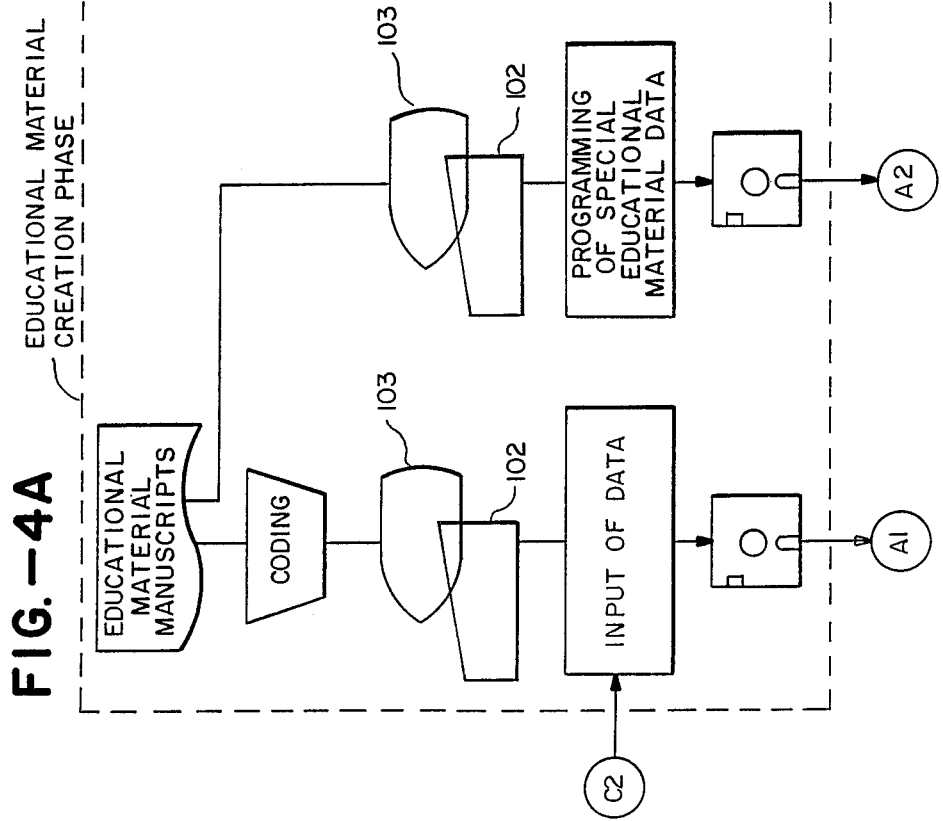

FIG. 3 shows an example of the configuration of the CMT edit block 130. In this figure, reference numeral 134 denotes an interface and 132 a CPU for controlling each block of the CMT edit block 130. A ROM 136 having, for example, 2KB storage capacity, stores the programs controlled by CPU 134. A RAM 138 is a buffer memory to be used during data read/write, and has a storage capacity of, for example, 2 KB. Reference numeral 140 denotes a cassette tape interface. The blocks 132, 134, 136, 138 and 140 are connected through a bus 141.

The cassette tape interface 140 has terminals for outputting the following signals, i.e., a control signal "MOTOR COMMAND" that controls a motor driver 146, which in turn drives the motor of a cassette tape mechanism 170; a control signal "PLAY COMMAND" that drives a playback solenoid 147; a control signal "FF COMMAND" that drives a fast-forward solenoid 148; a control signal "REW COMMAND" that drives a rewind solenoid 149; a control signal "Read/Write" that selects read or write mode; a control signal "Audio/Digital" that selects audio data signals or digital signals; and a digital data signal "Digital Data". The cassette tape interface 140 also has terminals for inputting a digital data signal "Digital Read" read out from the CMT2, an end information signal "TAPE END" of the CMT2 and a set signal "TAPE SET" of the CMT2.

A mixing amplifier 142 mixes audio data signals from an external microphone subsystem into the CMT editor block 130. A power amplifier 144 supplies audio data output signals from the CMT editor block 130 to the loud speaker 180.

An audio data signal switch 150 selects either one of audio data signals supplied from an audio read amplifier 154 or the mixing amplifier 142 in accordance with the control signal "Read/Write" and the control signal "Audio/Digital" and supplies the selected signal to a line amplifier 152. The audio data signal supplied from the audio switch 150 is supplied to a power amplifier 144 or to an audio write amplifier 156 via the line amplifier 152.

The audio write amplifier 156 and digital write amplifier 158 amplify the audio data signal supplied from the line amplifier 152 and the digital data signal supplied from the cassette tape interface 140, respectively, so that both signals can be written into the CMT2. The signals are then supplied to a head switch 160.

In accordance with the control signal "Read/Write" and the control signal "Audio/Digital", the head switch 160 selects read or write mode for tracks used for audio data on the CMT2 and read or write mode for tracks used for digital data on the CMT2. Audio data and digital data read from the CMT2 are supplied to the audio read amplifier 154 and a digital read amplifier 162, respectively.

The digital read amplifier 162 supplies the digital data supplied from the head switch 160 to the input terminals of the cassette tape interface 140. Reference numeral 164 denotes a sensor which supplies end of tape information and tape loading information to the input terminals of the cassette tape interface 140. The cassette tape mechanism 170 is publicly known.

FIGS. 4A to 4E show an example of the procedures of educational material program editing. These procedures consist mainly of the following seven phases.
(1) Educational material creation phase (see FIG. 4A)
Educational material data based on educational material manuscripts, such, as questions and answers, are inputted to the editor FIG. 1 according to a prescribed manner. It should be noted that special educational material data is data requiring a programming language system different from that of standard educational material data.
(2) Graphics creation phase (see FIG. 4B)
Colour graphics necessary for educational material display are created in the form of digital information and stored in a floppy disc.
(3) EDIT 2 phase (see FIG. 4C)
Various information such as character colour, underlining, display speed is added to character display information.
(4) EDIT 3 phase (see FIG. 4D)

Separately created graphics data and educational material data are integrated to form a story. Audio length and digital length are then adjusted in the story.
(5) Audio recording phase (see FIG. 4E)
An audio signal such as music, narration, required to proceed CAI procedure, is recorded.
(6) Simulation phase (see FIGS. 4C and 4D)
Using various data created in the phases described above, a simulation is performed of the actual proceeding of CAI procedure.
(7) Test phase (see FIG. 4E)
Tests are performed using an actual CAI terminal machine in accordance with the digital data mother tape created in the EDIT 3 phase and the audio data mother tape created in the recording phase.

The processing procedures in the above phases will be described in detail.

FIGS. 5A and 5B show an example of the processing procedures in the educational material data creation phase.

In step S502, an operator performs coding according to a question manuscript and men starts the input of educational material data by the console 101.

In step S504, questions to be given to a student are defined, a grading point system is added, hint statements for each question and other statements to be displayed on the display screen are inputted, keywords for the correct answer to the question are inputted and information for the correct answer, a secondary correct answer and an incorrect answer are inputted.

In step S506, it is decided to proceed to step S508 if data input continues or to step S510 if data input terminates in accordance with the progress of educational material data.

In step S508, inputted are programs that instruct to the CAI terminal machine 3 special educational material data overlay program processing, audio output relating to a question, character display, graphics display, acceptance of answer input for a question by the student, verification of answer, display of grade points, graphics processing, flow processing of question such as CMT skip, etc., grade point clear, wait time setting, waiting for pressing of carriage return key, etc.

In step S510, input data is stored on a floppy disc when data input is terminated.

Figure 6:
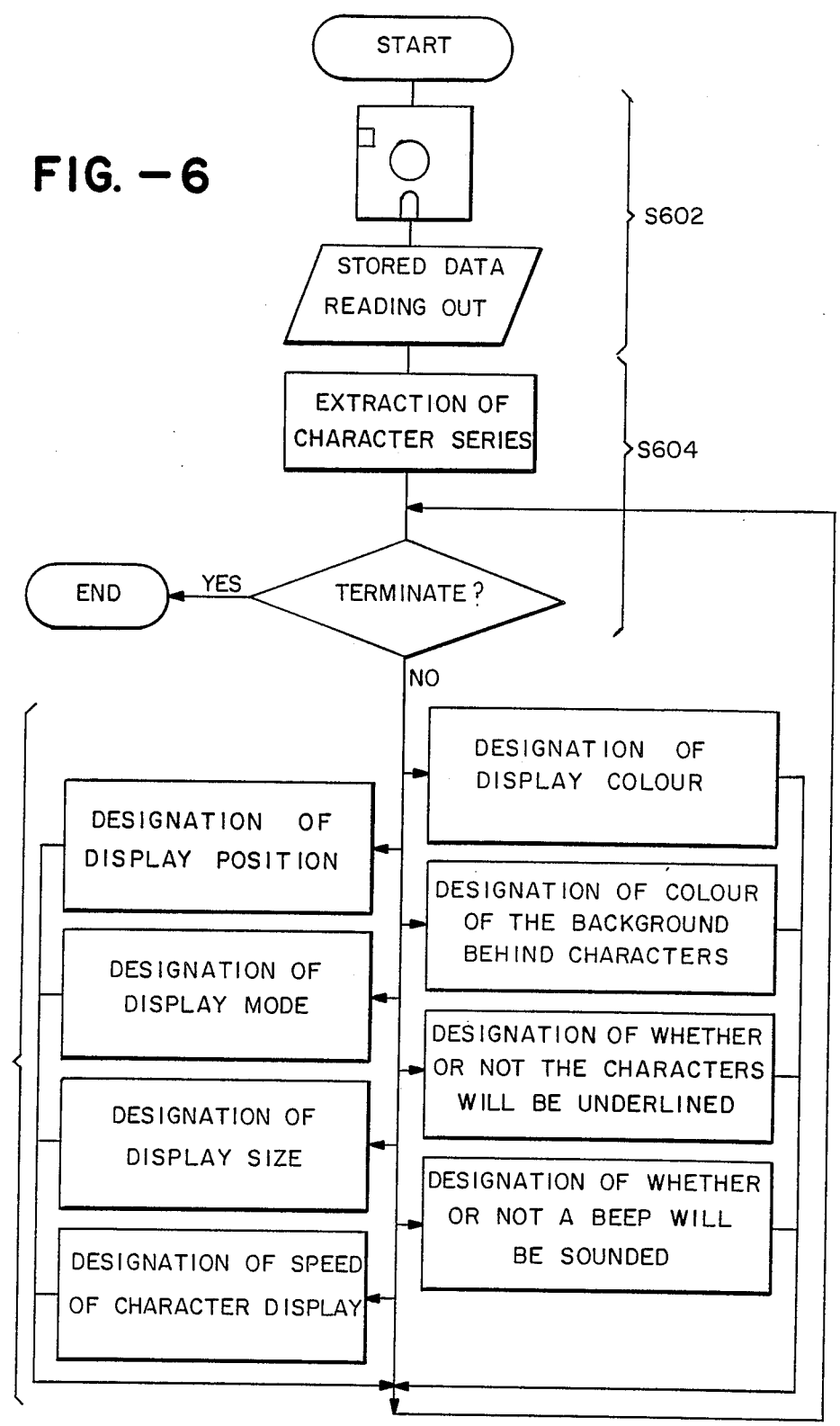

FIG. 6 shows an example of processing procedures in the EDIT 2 phase.

In step S602, data are read out from the floppy disc which stores data during the educational material data material creation phase.

In step S604, data for character series are extracted from the data that has been read out. If such data exists, it is decided to proceed to step S606. If there is no such data, EDIT 2 phase processing is terminated.

In step S606, various items relating to character series are designated. That is, display position on the display means in the CAI terminal machine 3, display mode, display size, display colour, colour of the background behind characters, whether or not the characters will be underlined, whether or not a beep will be sounded when the characters are displayed, speed of character display and so on are designated.

Figure 7:
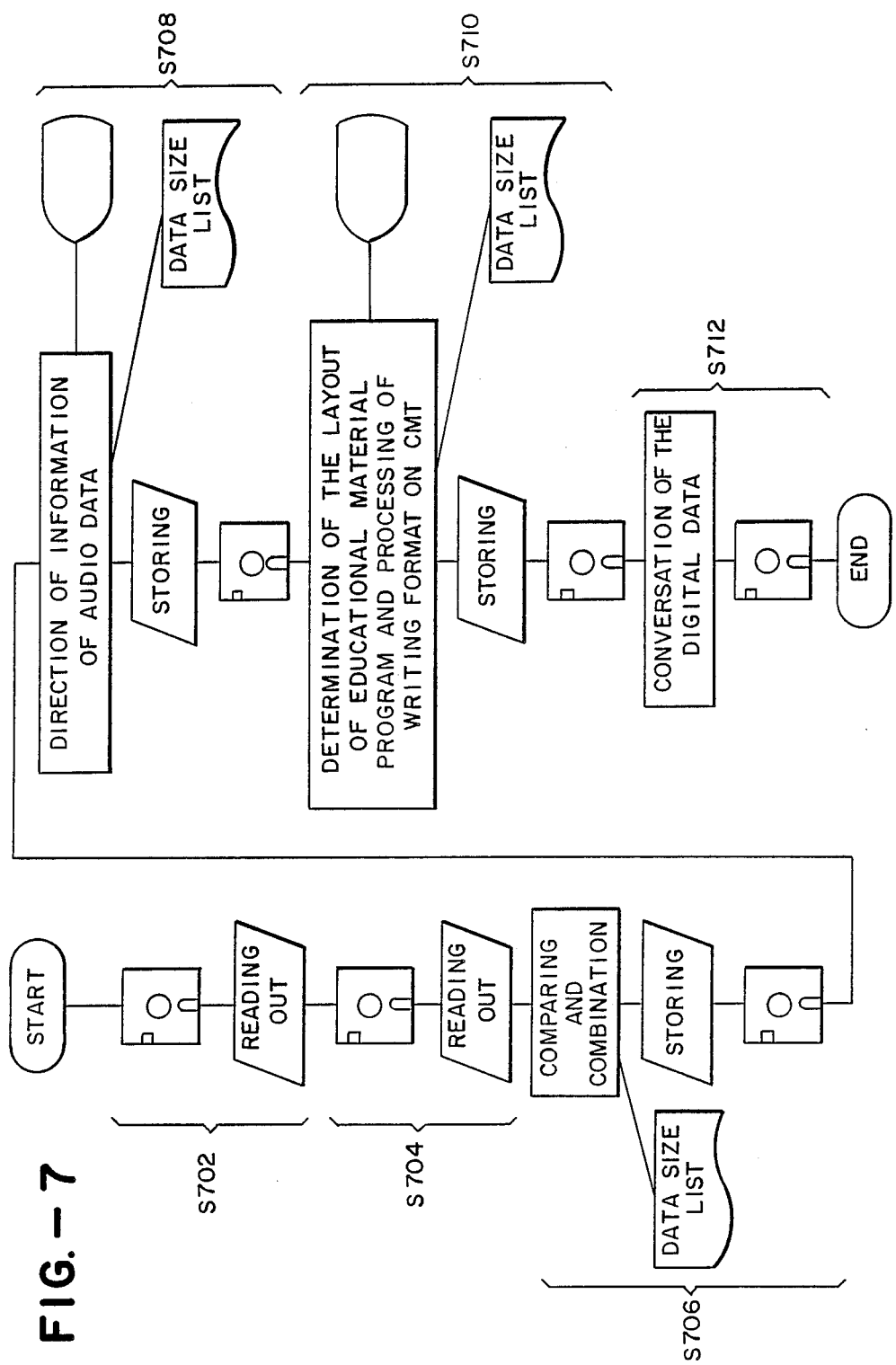

FIG. 7 shows an example of the processing procedures in the EDIT 3 phase.

In steps S702, data are read out from the floppy disc storing data in the EDIT 2 phase and then in step S704 data are read out from the floppy disc storing data in the graphics creation phase.

In step S706, graphics data are compared and combined with corresponding educational material data, while the sizes of the respective data are referred to and the combined data are stored on a floppy disc as digital data.

In step S708, information such as length of audio data is stored on a floppy disc, while data size is referred to.

The layout of educational material program is determined in step S710 based on information relating to audio data. In accordance with that decision, digital data format are converted, so that audio data and digital data are arranged in synchronism with each other on the CMT. The converted digital data are stored on a floppy disc.

In Step S712, digital data obtained in step S710 are processed, so that the digital data is converted into a form which can be recorded directly onto a CMT. The processed data is stored on a floppy disc as final digital data. A digital data mother tape is created using the digital data that was obtained in step S712 in a manner that the digital data mother tape is in synchronism with the audio data.

A manner of recording audio data and digital data on a CMT will be explained.

FIG. 8 shows the relationship between the track used for digital data (digital track) and the track used for audio data (audio track) on one side of the CMT. PBL denotes a physical record block having a fixed data length. Each of the suffixes n−1, n and n+1 of PBL denotes the block number from the CMT header. IRG is the non-recording area between physical records. Audio data "AUDIO" is recorded on the audio track corresponding to the recording position on the digital track of one or more physical records PBL.

The minimum unit of audio data corresponds to the time required to read one physical record PBL. Audio data are recorded over the length of several physical records, so that the data length of audio data can be increased by reading the several blocks continuously in series.

In other words, parallel recording of digital data and audio data, as shown in FIG. 8, enables the output of audio data AUDIO n, n+1 simultaneously with the read out of digital data recorded in, for example, the nth physical record PBLn and the n+1th physical record PBLn+1.

FIG. 9 shows an example of the format of the physical record PBL. The physical record may have a block length of, for example 1,536 bytes. At the head, each physical record has a two-byte area BSN, in which the block number is recorded, and at the tail a two-byte area SUM, in which the checksum word of the recorded data record DR is recorded. The contents of the areas BSN and SUM are checked in the CMT editor block 130.

FIG. 10 shows an example of the format of the logical records for the educational material program. L denotes a two-byte area in which the length l of the logical record is recorded. TYPE denotes a one-byte area in which information indicating the type of logical record is recorded. DATA denotes digital data for the educational material program.

The following types of logical records can be provided according to the type of educational material program.

(1) Question block (QH)

Minimun unit data of question including alphanumerics for the educational material program.

(2) Graphics block

Graphics data for the educational material program.

(3) Japanese language character block

Kanji (Chinese characters) and kana (Japanese alphabet) data for the educational material program.

(4) Block header (BH)

This is a marker indicating the start of a group of several question blocks when several interrelated question blocks are grouped. It is sufficient that the group consists of predetermined signal series of about 50 bytes.

(5) Tape header (TH)

The tape header contains information on the position of the block header BH on the CMT2. That is, information on the block number of the physical record PBL in which the block header exists, information on the number of question blocks after the block header, information on the location of audio data such as narration for educational material programs on the CMT2, and so on are contained.

It should be noted that the block header and the subsequent group of question blocks will be, hereinafter, referred to as a question group block.

ASCII codes corresponding to, for example, "Q", "P", "J", "B" and "T" are recorded TYPE for logical record types (1)–(5) in the area TYPE.

Lengths of question blocks, graphics blocks and Japanese language character blocks are variable. Thus, lengths of the logical records are not fixed, but can exist across several physical records, and thus can vary between 3 and FFFFH bytes. Physical records are hardly restricted by logical records. Thus, as will be shown in FIG. 11, digital data and audio data for the educational material programs can be recorded on the CMT in a manner that these digital and audio data have a position relationship that allows the educational material program to effectively proceed.

FIG. 11 shows an example of digital data for the educational material program recorded on the digital track and audio data for the educational material program recorded on the audio track. As shown in FIG. 11, it is preferable that the digital data and the audio data are recorded so that the digital data is always first read out before the audio data as the educational material program proceeds. In other words, if the CMT2 is travelling to provide audio information while question N is being studied, digital data after question N+1 should be read out during the audio output.

Figure 12A:
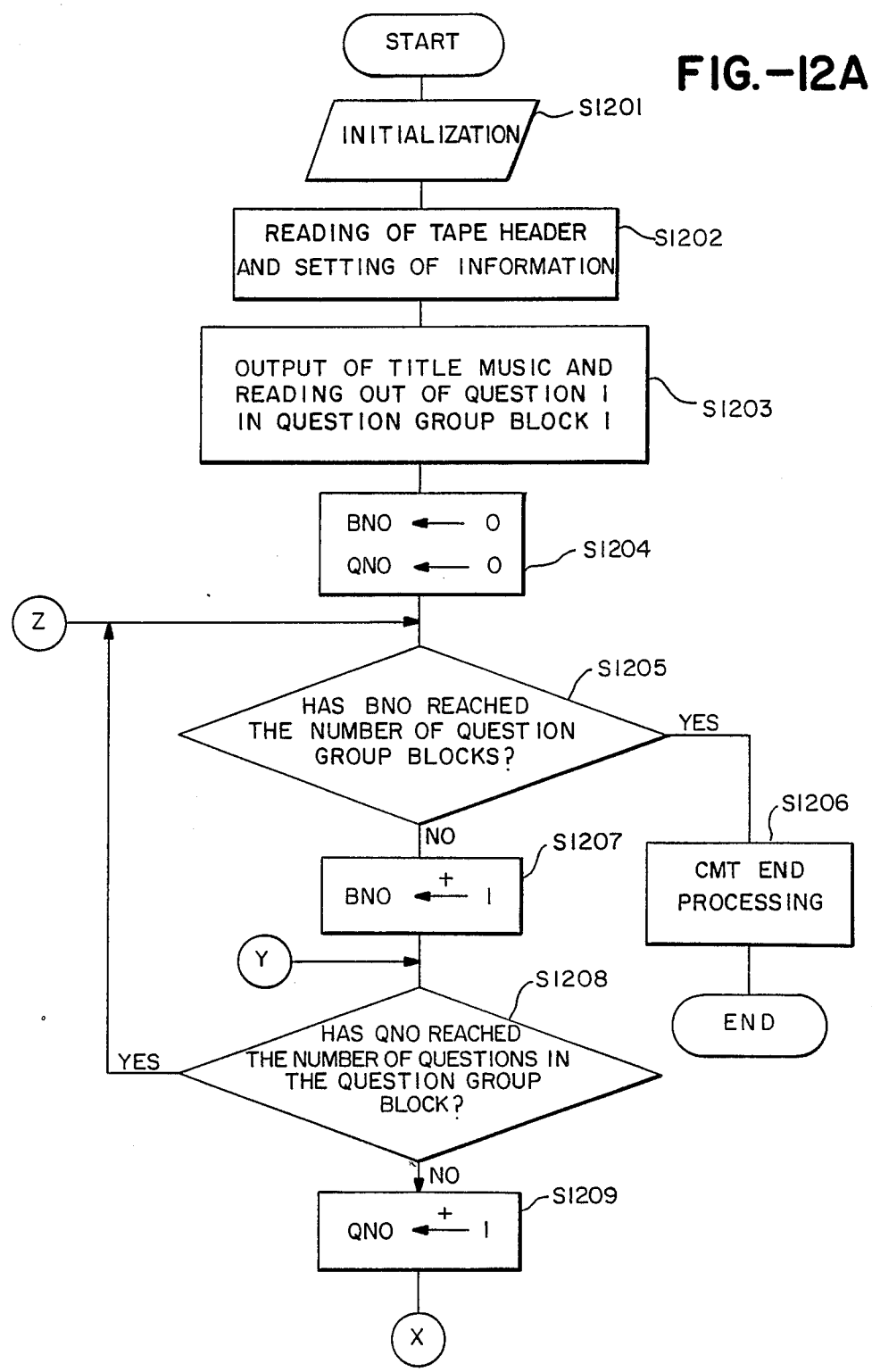

The CAI terminal machine 3 proceeds the educational material as illustrated, for example, in FIGS. 12A and 12B, according to the educational material programs created in this manner.

FIGS. 12A and 12B show one example of the procedures used by the CAI terminal machine 3 when running educational material programs. The CAI terminal machine 3 first performs initialization in step S1201. Next, the CAI terminal machine 3 runs the CMT2 to read the tape header in step S1202, so that the information recorded in the tape header are set. In step S1203, the CMT2 is run to read out question 1 in question group block 1 recorded on the digital track along with, for example, the output of title music recorded in the audio track. In step S1204, question group block number information BNO and question number information QNO are cleared. In step S1205, it is decided whether or not the number information BNO has reached the number of question group blocks recorded on the CMT. If the decision is affirmative, the processing moves to step S1206, where the educational material proceeding program is terminated after CMT end processing.

If the decision in step S1205 is negative, the processing moves to step S1207, where the block number information BNO is incremented by +1. Then, in step S1208, it is decided whether or not the question number information QNO has reached the number of questions recorded in the question group block. If the decision is affirmative, the processing returns to step S1205. If the decision is negative, the processing proceeds to step S1209, where question number information QNO is incremented by +1.

In step S1210, questions are transferred from the question buffer that stores questions read out the CMT2. The execution of the questions is started in step S1211. Immediately after the start-up of the CAI terminal machine 3, the first question in question group block 1, read in during the execution of step S1203, is executed. In step S1212, various processings for that question are executed. It should be noted that, as mentioned previously, while the audio output is being performed, digital data for the next and subsequent questions are read out during the travelling of the CMT2 and then stored in the question buffer.

According to the degree of student's progress in learning, that is, for example, according to the grade points earned by the student, a decision is made in step S1213 as to whether or not the question skips to another question group block. If the decision is negative, the processing returns to step S1208, where the next question is given in the question group block now under execution. If the decision is affirmative, the processing moves to step S1214.

In step S1214, the question buffer is initialized to be ready for a skip in the CMT2. Then, in step S1215, the position of the CMT2 is corrected and rereading start, and then the processing returns to step S1205. In step S1205, the processing with respect to the question group block, which is the destination of the skip, is initiated. It should be noted that the control of the CMT unit, such as the processing of the CMT skip, can be managed by a program in accordance with the physical record number BSN with the processing in step S1202.

As mentioned above, an editing system of educational material programs in a CAI system according to the present invention can record on a CMT, in parallel, both audio data to be served for learning through student's auditory sense and digital data such as character information to be served for learning through the student's visual sense, so that a CAI system with a high efficiency in learning is realized.

It should be noted that the application of the present invention is not limited to the above embodiments. That is, the present invention is applicable to any type of CAI system having means for reading educational material programs recorded on a CMT and means for outputting audio data and means for displaying characters. For example, the displaying means of the CAI terminal machine may be a liquid crystal display which displays one or several lines of character data.

Moreover, any language, for example, English, Japanese, Chinese, French, German, Russian or the like can be employed to create educational material program.

What is claimed is:

1. An educational material program editing system for a computer assisted instruction system, comprising:
    input means for inputting data, including question information to be assigned to a student;
    storing means for storing eductional material data formed by the data inputted by said input means;
    first recording means for recording audio data relating to said question information;
    relocating means for relocating the layout of said eduction material data stored in said storage means on the basis of the audio data recorded by said first recording means; and
    second recording means for recording said relocated educational material data and said audio data in parallel on a recording medium so that said relocated eductional material data is related to said audio data on said recording medium to form an educational material program.

2. An editing system of educational material program for a computer asisted instruction system as claimed in claim 1, wherein said audio data and said educational material data corresponding to question information are recorded on said recording medium in a manner that said educational material data in always first read out in advance of the audio data corresponding to said question information as said educational material program proceeds.

3. An editing system of educational program for a computer assisted instruction system as claimed in claim 1, wherein sai second recording means records information which indicates the recording position of said question information on said recording medium.

4. An editing system of educational program for a computer assisted instruction system as claimed in claim 2, wherein said second recording means records information which indicates the recording position of said question information on said recording medium.

5. An editing system of educational program for a computer assisted instruction system as claimed in claim 1, wherein said input means has means for converting said question information to digital data, so that said digital data is stored as said educational material data in said storage means.

6. An editing system of educational program for a computer assisted instruction system as claimed in claim 2, wherein said input means has means for converting said question information to digital data, so that said digital data is stored as said educational material data in said storage means.

7. An editing system of educational program for a computer assisted instruction system as claimed in claim 3, wherein said input means has means for converting said question information to digital data, so that said digital data is stored as said educational material data in said storage means.

8. An editing system of educational program for computer assisted instruction system as claimed in claim 1, wherein said educational material data, including graphics and character information related to problems assigned to the student, is constructed so that the graphics and character information are alternately stored in the storage means.

9. An editing system of educational program for computer assisted instruction system as claimed in claim 2, wherein said educational material data, including graphics and character information related to problems assigned to the student, is constructed so that the graphics and character information are alternately stored in the storage means.

10. An editing system of educational program for computer assisted instruction system as claimed in claim 3, wherein said education material data, including graphics and character information related to problems assigned to the student, is constructed so that the graphics and character information are alternately stored in the storage means.

11. An editing system of educational program for computer assisted instruction system as claimed in claim 5, wherein said educational material data, including grapics and character information relates to problems assigned to the student is constructed so that the graphics and character information are alternately stored in the storage means.

12. An editing system of educational program for a computer assisted instruction system as claimed in claim 1, wherein said recording medium is a magnetic tape.

13. An editing system of educational program for a computer assisted instruction system as claimed in claim 2, wherein said recording medium is a magnetic tape.

14. An editing system of educational program for a computer assisted instruction system as claimed in claim 3, wherein said recording medium is a magnetic tape.

15. An editing system of educational program for a computer assisted instruction system as claimed in claim 5, wherein said recording medium is a magnetic tape.

16. An editing system of educational program for a computer assisted instruction system as claimed in claim 8, wherein said recording medium is a magnetic tape.

17. An editing system of education program for a computer assisted instruction system as claimed in claim 12, wherein said magnetic tape has at least two tracks on one side of said magnetic tape;
    one track has physical records in which data of a fixed length is recorded and non-recording areas in which no data is recorded which are recorded alternately in the travelling direction of said magnetic tape so that said digital data is recorded in said physical records;
    said audio data is recorded on the other track in such a way that said audio data corresponds in position to one or more physical records, with one physical record as a minimum unit, in accordance with the length of said audio data recorded by said recording means; and
    the beginning of said recorded audio data is located at a position corresponding to the beginning of the first physical record of said one or more physical records existing at the starting position in the travelling direction of said magnetic tape and the end of said recorded audio data is located at a position corresponding to the end of the last physical record of said one or more physical record existing at the end position in said travelling direction.

18. An editing system of educational program for a computer assisted instruction system as claimed in claim 13, wherein said magnetic tape has at least two tracks on one side of said magnetic tape;
    one track has physical records in which data of a fixed length is recorded and non-recording areas in which no data is recorded which are recorded alternately in the travelling direction of said magnetic tape so that said digital data is recorded in said physical records;
    said audio data is recorded on the other track in such a way that said audio data corresponds in position to one or more physical records, with one physical record as a minimum unit, in accordance with the length of said audio data recorded by said recording means; and
    the beginning of said recorded audio data is located at a position corresponding to the beginning of the first physical record of said one or more physical records existing at the starting position in the tavelling direction of said magnetic tape and the end of said recorded audio data is located at a position corresponding the end of the last physical record of said one or more physical record existing at the end position in said travelling direction.

19. An editing system of educational program for a computer assisted instruction system as claimed in claim 14, wherein said magnetic tape has at least two tracks on one side of said magnetic tape;
    one track has physical records in whcih data of a fixed length is recorded and non-recording areas in which no data is recorded which are recorded alternately in the travelling direction of said magnetic tape so that said digital data is recorded in said physical records;
    said audio data is recorded on the other track in such a way that said audio data corresponds in position to one or more physical records, with one physical record as a minimum unit, in accordance with the length of said audio data recorded by said recording means; and
    the beginning of said recorded audio data is located at a position corresponding to the beginning of the first physsical record of said one or more physical records existing at the starting position in the travelling direction of said magnetic tape and the end of said recorded audio data is located at a position corresponding to the end of the last physical record of said one or more physical record existing at the end position in said travelling direction.

20. An editing system of educational program for a computer assisted instruction system as claimed in claim 15, wherein said magnetic tape has at least two tracks on one side of said magnetic tape;
    one track has physical records in which data of a fixed length is recorded and non-recording areas in which no data is recorded which are recorded alternately in the travelling direction of said magnetic tape so that said digital data is recorded in said physical records;
    said audio data is recored on the other track in such a way that said audio data corresponds in position to one or more physical records, with one physical record as a minimum unit, in accordance with the length of said audio data recorded by said recording means; and
    the beginning of said recorded audio data is located at a position corresponding to the beginning of the first physical record of said one or more physical records existing at the starting position in the travelling direction of said magnetic tape and the end of said recorded audio data is located at a position corresponding to the end of the last physical record of said one or more physical record existing at the end position in said travelling direction.

21. An editing system of educational program for a computer assisted instruction system as claimed in claim 16, wherein said magnetic tape has at least two tracks on one side of said magnetic tape;
    one track has physical records in which data of a fixed length is recorded and non-recording areas in which no data is recorded which are recorded alternately in the travelling direction of said magnetic tape so that said digital data is recorded in said physical records;

said audio data is recorded on the other track in such a way that said audio data corresponds in position to one or more physical records, with one physical record as a minimum unit, is accordance with the length of said audio data recorded by said recording means; and the beginning of said recorded audio data is located at a position corresponding to the beginning of the first physical record of said one or more physical records existing at the starting position in the travelling direction of said magnetic tape and the end of said recorded audio data is located at a position corresponding to the end of the last physical record of said one or more physical record existing at the end position in said travelling direction.

22. A method of editing an educational material program, comprising the steps of:
(a) storing educational material including question information in a memory;
(b) recording audio data relating to the question information;
(c) rearranging the educational material stored in the memory on the basis of information relating to the recorded audio data; and
(d) recording the rearranged educational material and the audio data in parallel on a recording medium so that the rearranged educational material is related to the audio data on the recording medium.

23. A method of editing an educational material program according to claim 22, wherein said step (d) comprises recording the rearranged educational material and the audio data on the recording medium so that the rearranged educational material is read from the recording medium prior to the related audio data as the educational material program proceeds.

24. A method of editing an educational material program according to claim 22, further comprising the step of recording information on the recording medium which indicates the position of the audio data on the recording medium.

25. A method of editing an educational material program according to claim 23, further comprising the step of recording information on the recording medium which indicates the position of the audio data on the recording medium.

26. A method of editing an educational material program according to claim 22, wherein said step (a) comprises alternately storing graphics and character information included in the educational material.

* * * * *